July 4, 1961  W. J. OHLER  2,990,615
FRUIT AND VEGETABLE CORING TOOL
Filed May 8, 1959
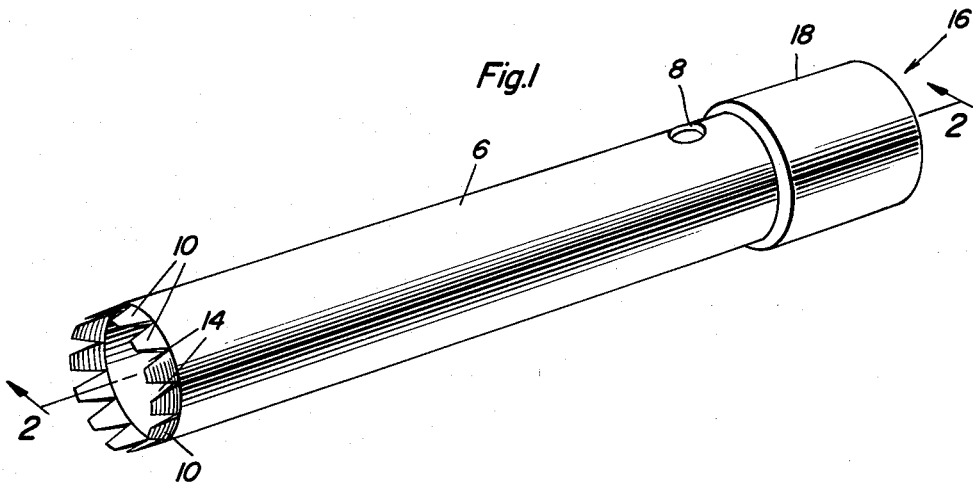
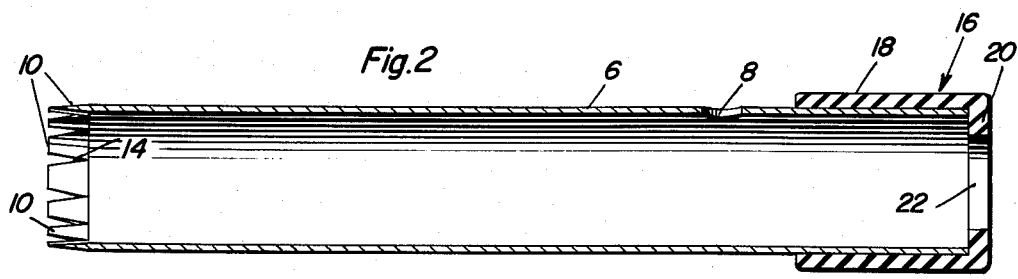
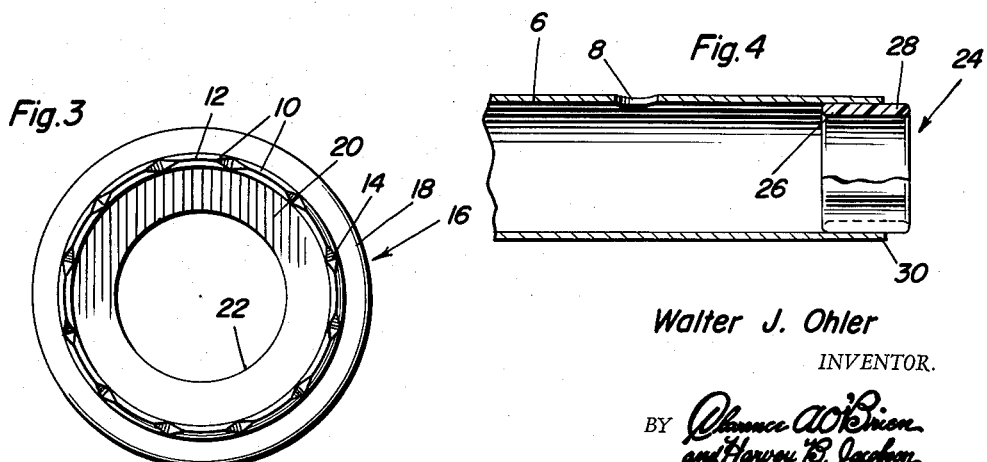
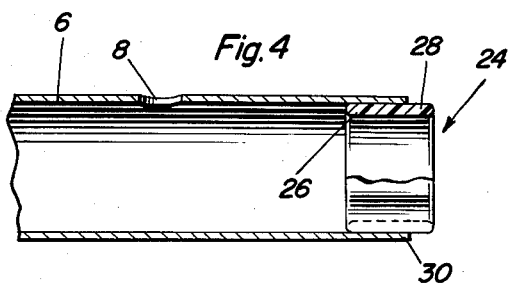
Walter J. Ohler
INVENTOR.

ately usable tools and has reference

United States Patent Office 2,990,615
Patented July 4, 1961

2,990,615
FRUIT AND VEGETABLE CORING TOOL
Walter J. Ohler, % Plaquemines Parish Boat Service, Inc., Venice, La.
Filed May 8, 1959, Ser. No. 812,037
2 Claims. (Cl. 30—316)

The present invention relates to manually usable kitchen and table implements and tools and has reference in particular to a corer which functions to quickly and easily dislodge and remove the core of certain fruits and vegetables.

More particularly the invention pertains to a corer which is simple, economical to manufacture and inexpensive insofar as the purchaser is concerned and which may be expeditiously and reliably used by an unskilled person to remove the core and seeds from an orange, a grapefruit, an apple, a pear, which can also be successfully used in removing the center of a head of cabbage or lettuce, the roots and center from an onion and may also be employed to scale kernels of corn from a cob.

In carrying out the invention an elongated rigid lightweight tube open at its respective ends and generally circular in cross-section is utilized. The leading end of the tube is serrated and the serrations are suitably cut and shaped and the marginal edges are sharpened to provide circumferentially spaced cutting teeth separated by intervening clearance notches.

The cutting teeth are on the leading outer or distal end. On the other proximal end either a rubber cap or a rubber or an equivalent plug is provided to serve as an impact element to receive blows from the palm of the hand which may be relied upon to forcibly drive the tool through the central portion of the fruit or vegetable being acted upon.

Other objects, features and advantages will become more readily apparent from the following description and the accompanying drawing.

In the drawing wherein like numerals are employed to designate like parts throughout the views:

FIG. 1 is a perspective view illustrating a hand tool or implement constituting the aforementioned fruit and vegetable corer and constructed in accordance with the principles of the invention.

FIG. 2 is a longitudinal sectional view on the plane of the line 2—2 of FIG. 1.

FIG. 3 is an enlarged view showing the leading or distal end and emphasizing the construction and arrangement of the cutting teeth.

FIG. 4 is a fragmentary view in section showing a modified impact member in the form of a collar-like insert, a portion of said insert appearing in elevation.

Referring now to the drawing the tool as is shown comprises an elongated open-ended tube of sheet material which might well be stainless steel, a proper grade or kind of aluminum such as is used in kitchen ware, or perhaps in certain instances commercial plastics of requisite strength that would be capable of being molded to provide practical or feasible cutting teeth. In any event the tube is of suitable length and cross-section and is denoted as an entity by the numeral 6. The side hole toward the right hand end in the drawings is denoted at 8 and is primarily used for hanging the device up on a nail or a hook (not shown) when it is not being used. The distal or leading end is serrated and the serrations are fashioned into cutting teeth. The teeth are denoted by the numeral 10 and each tooth is of truncated triangulate shape or form with the leading end fashioned into a sharp cutting edge 12. Actually the broad surface of the teeth are filed or otherwise bevelled and sharpened to provide reliable penetrating and cutting edges. There are suitable V-shaped spaces 14 between the teeth. The teeth are arranged in a circular pattern and they may be driven straight down and into the central or hub portion of the fruit or vegetable and the tube turned and twisted back and forth, as it were, to do the desired cutting and reaming job. On the hand-pounded trailing or proximal end an appropriate impact fitting is provided. This takes the form of a rubber, a cork or equivalent sturdy cap 16 in FIGS. 1 to 3. The skirt or sleeve portion 18 of the cap snugly surrounds the exterior of the tube and the inturned flange 20 provides a desired pounding or impacting surface and the central opening 22 provides a vent and also for the release and discharge of the cuttings or cored material.

Actually the modification seen in FIG. 4 is so nominal that the same reference numerals are employed to designate the tube and hole as at 6 and 8 respectively. Instead of using a cap 16 the impacting and driving element or means comprises a collar-like insert 24 the inner end 26 of which is latched telescopically fitted and suitably secured in place (not detailed) and the outer end 28 projecting beyond the end 30 of the tube to provide the desired end-thrust and impacting or pounding surface.

It is repeated that the leading or distal end with its cutting teeth may be forcibly pounded or driven into the center portion of the fruit or vegetable and then rotated back and forth to provide the desired reaming and cutting result. It has been used successfully for coring the central and seed laden portion from an orange, grapefruit, apple, pear, cabbage, lettuce, onions and the like. Like any other tools and implements which have to be used by persons, the precise manner of adaption and use may vary inasmuch as experience is usually the best teacher in using a hand tool once one knows of the general purposes and at least one mode of operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A corer for fruits and vegetables comprising an elongated rigid open-ended tube circular in cross-section and having a leading distal end provided with wedge-shaped penetrating and reaming teeth and having thrust exerting and blow receiving means on the proximal end, said teeth being separated by intervening clearance notches, the interior and exterior surfaces of said teeth being beveled, the bevels converging to provide cutting edges at the leading ends of the teeth, said tube being of non-corrodible metal, and a compressibly resilient cap mounted on the proximal end of the tube, said cap having a skirt-like sleeve fitting over the tube and a lateral turned in endless annular flange resting against an end of the tube.

2. A corer for fruits and vegetables comprising an elongated rigid open-ended tube circular in cross-section having a leading distal end provided with penetrating and reaming teeth and having end thrust exerting means on the proximal end, said teeth comprising a plurality of serrations with intervening notches defining a ring of cutting teeth, the interior and exterior surfaces of said teeth being beveled, the bevels converging to provide cutting edges at the leading ends of the teeth, said teeth being of truncated triangulate shape and being separated by intervening notches which are of V-shaped form with the vertices of the notches located at the basal portions of the teeth and providing equidistant circumferentially spaced clearance notches, and a compressibly resilient collar, a portion of said collar fitting telescopically and retentively into the cooperating proximal end portion of the tube and a portion of said collar projecting beyond the end of the tube.

References Cited in the file of this patent

UNITED STATES PATENTS

| | | |
|---|---|---|
| 865,628 | Carsley | Sept. 10, 1907 |
| 1,293,351 | Creasey | Feb. 4, 1919 |
| 1,371,948 | Szutz | Mar. 15, 1921 |
| 1,632,227 | Halsey | June 14, 1927 |
| 2,315,898 | Krilow | Apr. 6, 1943 |
| 2,370,650 | Fitzsimmons | Mar. 6, 1945 |
| 2,549,008 | Rasaka et al. | Apr. 17, 1951 |

FOREIGN PATENTS

| 788,641 | France | July 29, 1935 |